A. D. SIMPSON.
AUTOMOBILE TIRE.
APPLICATION FILED JAN. 24, 1911.
994,610.
Patented June 6, 1911.
2 SHEETS—SHEET 1.
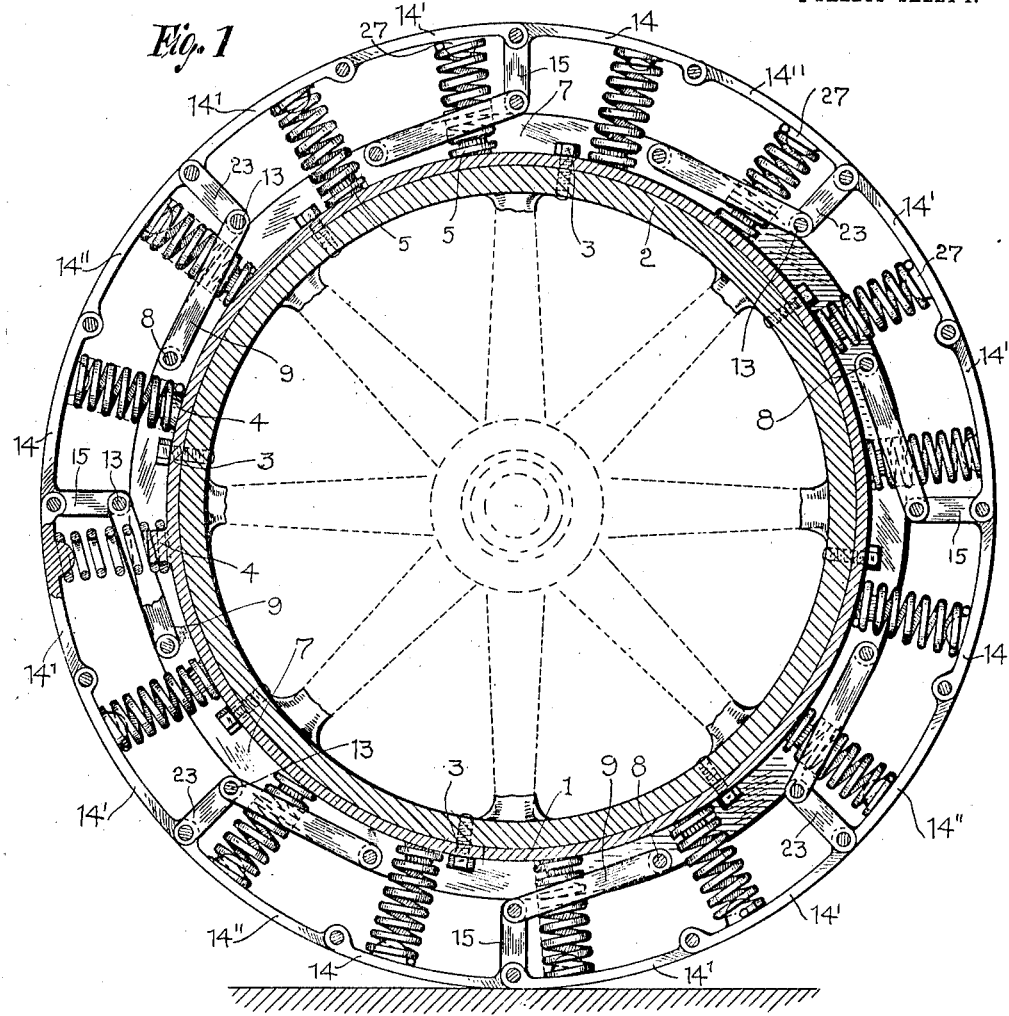
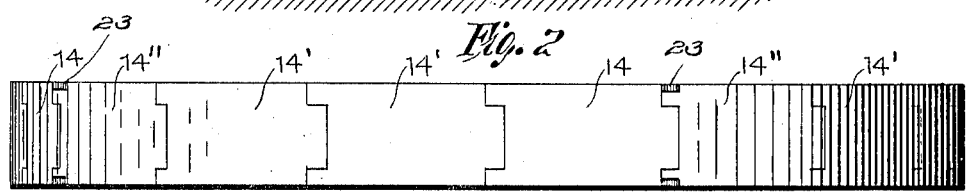
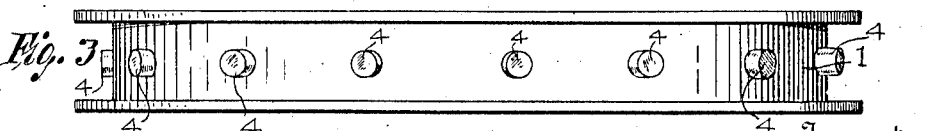
Witnesses
Robert M. Sutphen.
Ross J. Woodward.
Inventor
A. D. Simpson
By E. E. Vrooman,
his Attorney.

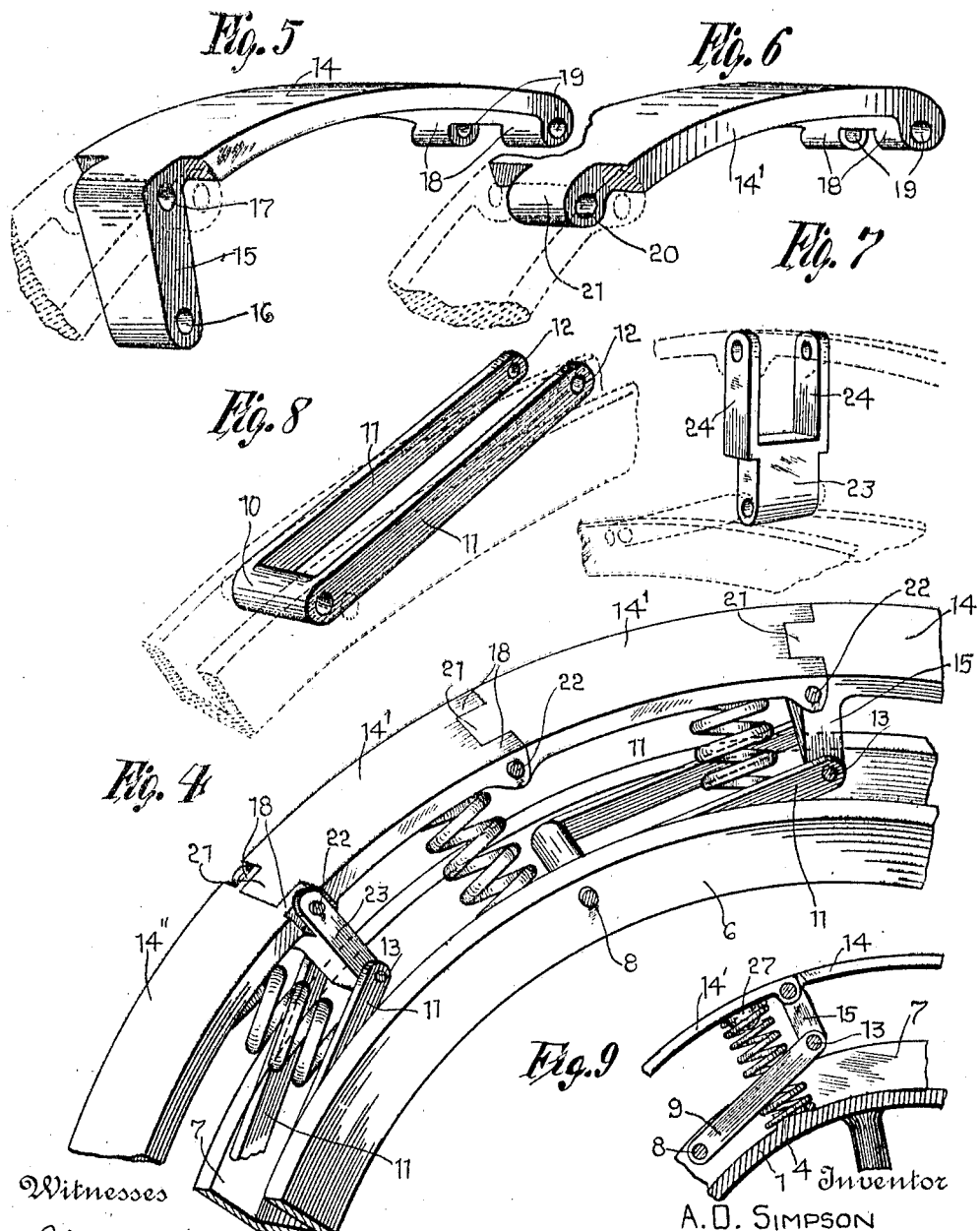

UNITED STATES PATENT OFFICE.

ARTHUR D. SIMPSON, OF ORION, KANSAS.

AUTOMOBILE-TIRE.

994,610.  Specification of Letters Patent.  Patented June 6, 1911.

Application filed January 24, 1911. Serial No. 604,462.

*To all whom it may concern:*

Be it known that I, ARTHUR D. SIMPSON, a citizen of the United States of America, residing at Orion, in the county of Gove and State of Kansas, have invented certain new and useful Improvements in Automobile-Tires, of which the following is a specification, reference being had therein to the accompanying drawing.

This invention relates to spring tires and the principal object of the same is to provide a tire which will conform to the surface of the road over which the vehicle travels, and, thus take up any jolts which would be liable to be caused by rough roads.

This invention is illustrated in the accompanying drawings wherein:

Figure 1 is a side view of the improved tire partly in section and shows the same as it would appear when secured to a wheel. Fig. 2 is a view of the outer rim of the tire. Fig. 3 is a view of the channel rim used in connection with this tire. Fig. 4 is a semi-diagrammatic view of a section of this improved tire. Fig. 5 is a perspective view of one of the sections of the outer rim, shown in Fig. 2. Fig. 6 is a perspective view of another section of the outer rim. Fig. 7 is a perspective view of one of the brackets which support the section shown in Fig. 6. Fig. 8 is a perspective view of one of the braces which connect the bracket with the channel rim. Fig. 9 is a fragmentary view of a modified form of wheel.

Referring to the accompanying drawings by numerals, it will be seen that this improved tire comprises a channel rim 1, which is mounted upon the rim 2 of a wheel, and secured to the rim by means of the bolts 3. The channel rim is provided with a plurality of equally spaced lugs 4 upon each of which there is mounted a coil spring 5. The side walls 6 and 7 of the channel rim are provided with alined openings in which there are mounted pivot pins 8, upon each of which there is mounted a brace 9. Each of the braces comprises a cylindrical body portion 10 from the ends of which extends a pair of arms 11, the outer ends of which are provided with a pair of alined openings 12 in which a pivot pin 13 is mounted.

The outer rim of this tire comprises a plurality of pivotally connected sections 14, 14', and 14''. The outer rim of the tire shown is composed of sixteen sections; sections 14 being provided at one end with a depending lug 15, which is provided at its lower end with a transverse opening 16 and in its upper end is provided with a transverse opening 17. The other end of the section 14 is provided with a pair of spaced hinge ears 18, which are provided with alined openings 19, which register with the opening 20 formed through the centrally located lug 21 of the adjoining sections 14''. Pins 22 pass through the alined openings and hold the sections in pivotal relation. In the section 14'' the hinge ears 18 are reduced so that the ends of the pin 22 which extend to each side of the ears project to a greater amount than in the remaining sections. A bracket 23 is pivotally mounted upon the protruding ends of the pin by means of arms 24 which have their lower ends merging into the body portion. The body portion is provided with a transverse opening through which one of the pins 13 is passed, and pivotally mounts the bracket between the arms 11 of the brace 9. The lug 15 is also connected with the channel in a similar manner. Each of the sections 14 is provided upon its inner surface with a lug 27 around which the upper end of one of the coil springs 5 is mounted, so that the spring is held properly in place. A section 14 having the depending lug 15 is connected with one of the braces and with a section 14' and a section 14''. A second section 14' similar to Fig. 6 is pivotally mounted between the hinge ears 18 of the section 14'' and with the lug 21 of the adjoining section 14'. The bracket 23 is pivotally mounted upon the protruding ends of the pin 22, the lower end of the bracket being pivotally mounted between the arms of a second brace 9. The springs 5 are located adjacent the ends of the sections, so that the tire is braced near the pivot pins and is thus able to resist more pressure. It should also be noted that every other spring is placed between the arms of the braces and thus the brackets and lugs 15 are prevented from coming in contact with the channel plate. If desired the rim 1 and the rim 2 can be formed of one piece of metal in which case there whould be only one rim instead of two. In Fig. 9 is shown the manner in which this modified form of wheel is constructed.

What I claim is:

A tire comprising a rim, an outer rim formed from a plurality of pivotally connected sections, lugs formed upon certain of said sections, brackets pivotally connected with certain other of said sections, braces connecting said lugs and brackets with said rim, each of said braces comprising a cylindrical body portion, an arm formed at each end of said body portion and pivotally connected with the end of one of said lugs or brackets, and springs positioned between said rim and said sections.

In testimony whereof I hereunto affix my signature in presence of two witnesses.

ARTHUR D. SIMPSON.

Witnesses:
J. E. BORAH,
K. A. BORAH.